(12) United States Patent
Bernabe et al.

(10) Patent No.: US 8,372,941 B2
(45) Date of Patent: Feb. 12, 2013

(54) METHOD FOR PURIFICATION OF POLYETHER POLYMERS AND MIXTURES RESULTING THEREFROM

(75) Inventors: Beatriz Penalver Bernabe, Chicago, IL (US); Thomas Guggenheim, Mt. Vernon, IN (US); David Bruce Hall, Ballston Lake, NY (US); Norman Johnson, Mt. Vernon, IN (US); Juan Justino Rodriguez Ordonez, Madrid (ES); David Woodruff, Saratoga Springs, NY (US)

(73) Assignee: Sabic Innovative Plastics IP B.V. (NL)

( * ) Notice: Subject to any disclaimer, the term of this patent is extended or adjusted under 35 U.S.C. 154(b) by 16 days.

(21) Appl. No.: 11/962,288

(22) Filed: Dec. 21, 2007

(65) Prior Publication Data

US 2009/0163691 A1   Jun. 25, 2009

(51) Int. Cl.
*C08G 8/02* (2006.01)
(52) U.S. Cl. .................. 528/125; 528/171; 528/170
(58) Field of Classification Search .................. 528/125, 528/171, 170
See application file for complete search history.

(56) References Cited

U.S. PATENT DOCUMENTS

| | | | |
|---|---|---|---|
| 4,217,438 A | 8/1980 | Brunelle et al. | |
| 4,460,778 A | 7/1984 | Brunelle | |
| 4,520,204 A | 5/1985 | Evans | |
| 4,554,357 A | 11/1985 | Verbicky, Jr. et al. | |
| 4,577,033 A | 3/1986 | Verbicky, Jr. et al. | |
| 4,605,745 A | 8/1986 | Brunelle et al. | |
| 5,081,298 A | 1/1992 | Brunelle | |
| 5,116,975 A | 5/1992 | Brunelle | |
| 5,529,482 A | 6/1996 | Mayerhofer | |
| 5,908,915 A | 6/1999 | Brunelle | |
| 6,630,568 B1 | 10/2003 | Johnson et al. | |
| 6,790,934 B2 | 9/2004 | Johnson et al. | |
| 2002/0151675 A1* | 10/2002 | Johnson et al. | 528/491 |

FOREIGN PATENT DOCUMENTS

| | | |
|---|---|---|
| EP | 0763521 A2 | 3/1997 |
| TW | 200740878 | 2/2006 |
| WO | 0121686 | 3/2001 |
| WO | 2005/021618 | 3/2005 |

OTHER PUBLICATIONS

Fu, Jiquan. Salt Efect on Vapor-Liquid Equilibria for Binary Systems of Propanol/CaCl2 and Butanol/CaCl2. Fluid Phase Equilibria, vol. 237. pp. 219-223, Jul. 2005.
International Search Report for International Application No. PCT/US2008/087160, mailed Jun. 10, 2009, 3 pages.
Written Opinion for International Application No. PCT/US2008/087160, mailed Jun. 10, 2009, 6 pages.
Taiwan Patent No. 200740878; Publication date: Nov. 1, 2007; Abstract Only; 3 pages.

* cited by examiner

*Primary Examiner* — Shane Fang
(74) *Attorney, Agent, or Firm* — Cantor Colburn LLP; Diderico van Eyl

(57) ABSTRACT

A method for the purification of aromatic polyether polymers prepared by a halide displacement polymerization process comprises adsorbing the catalyst with an alkali metal halide to form an adsorbent component and then removing the adsorbent component. Mixtures resulting from this method are also discussed.

16 Claims, No Drawings

METHOD FOR PURIFICATION OF POLYETHER POLYMERS AND MIXTURES RESULTING THEREFROM

BACKGROUND

Disclosed herein are methods for purification of aromatic polyethers, and more particularly to methods for purification of aromatic polyetherimides and polyethersulfones.

Various types of aromatic polyethers, particularly polyetherimides, polyethersulfones, polyetherketones, and polyetheretherketones have become important as engineering resins by reason of their excellent properties. These polymers are typically prepared by the reaction of salts of dihydroxyaromatic compounds, such as bisphenol A (BPA) disodium salt, with dinitroaromatic molecules or dihaloaromatic molecules. Examples of suitable dihaloaromatic molecules include bis(4-fluorophenyl)sulfone, bis(4-chlorophenyl)sulfone, and the analogous ketones and bisimides as illustrated by 1,3-bis[N-(4-chlorophthalimido)]benzene.

According to U.S. Pat. No. 5,229,482, the preparation of aromatic polyethers by displacement polymerization may be conducted in the presence of a relatively non-polar solvent, using a phase transfer catalyst which is substantially stable under the temperature conditions employed. Suitable catalysts include ionic species such as guanidinium salts. Suitable solvents disclosed therein include o-dichlorobenzene, dichlorotoluene, 1,2,4-trichlorobenzene, and diphenyl sulfone.

It is desirable to isolate aromatic polyether from a reaction mixture free from contaminating species that may affect the polymer's final properties in typical applications. In a typical halide displacement polymerization process, contaminating species often include alkali metal halide and other alkali metal salts, residual monomer species, and residual catalyst species. For maximum efficiency of operation it is desirable to recover any solvent employed and other valuable compounds, such as catalyst species, and to provide waste streams which do not contaminate the environment. In particular it is often desirable to recover alkali metal halide, especially sodium chloride, for recycle to a brine plant for production of sodium hydroxide and chlorine.

Many conventional techniques are used to purify polymer-containing organic solutions. For instance, extraction with water and settling by gravity in a mixer/settling tank has been used for removal of aqueous-soluble species. However, water extraction methods are problematic when the water phase emulsifies with or does not phase separate efficiently from the organic phase. For example, polyethers in anisole solutions present difficulties when mixing with water and separating by settling. Pure water typically will not separate from anisole or polymer/anisole solutions after mixing near room temperature because the difference between water and anisole densities is very small. Under these conditions emulsions may form. Even if the first stage of extraction is performed under conditions where density differences drive the separation of water (for example, treatment with brine), the final stage of extraction of water-soluble species still requires use of relatively pure water, which is more prone to emulsification. The end result is that even though alkali metal halide and/or catalyst may be transferred to the aqueous phase, the entrained water in the emulsified organic phase prevents a high recovery of both the halide and the catalyst. High purity polymer solutions with minimal residual species may then be extremely difficult if not impossible to obtain. Another constraint is that the time for separation of the aqueous and organic phases must be fast, preferably on the order of minutes, so that separation rates do not slow down production. A method is needed that more efficiently removes alkali metal halide and other alkali metal salts, residual monomer species, and residual catalyst species.

BRIEF DESCRIPTION

Disclosed herein are methods for purifying aromatic polyethers prepared in water-immiscible solvents. These methods provide effective ways for removing guanidinium catalysts such as hexaethyl guanidinium (HEG) and catalyst byproducts such as pentaethyl guanidinine (PEG) from mixtures formed during the process in the substantial absence of water, thereby avoiding the formation of an emulsion.

An aromatic polyether is made by halide displacement polymerization and the polymerization reaction is quenched with acid at a first temperature to form a polymerization mixture. The polymerization mixture contains less than 0.005 weight percent of water, based on the total weight of the polymerization mixture. The aromatic polyether is selected from the group polyetherimides, polyethersulfones, polyetherketones, polyetheretherketones, and combinations thereof. The polymerization mixture comprises, in addition to the polyether, a guanidinium catalyst, an alkali metal halide, an acid component (from the quenching), and an organic solvent. The polymerization mixture is subjected to a second temperature to allow adsorption of the guanidinium catalyst with the alkali metal halide to form an adsorbed component. The adsorbed component is removed to form a second mixture. Less than 0.005 weight percent of water (50 ppm) is present during the process. The guanidinium catalyst can be hexaethyl guanidinium chloride (HEGCL) and the alkali metal halide can be sodium chloride. When the catalyst is hexaethyl guanidinium chloride the polymerization mixture and the adsorbed component can further comprise pentaethyl guanidinine.

Also disclosed herein are mixtures made by the process described in the preceding paragraph.

Also disclosed is a polymer containing mixture consisting essentially of an aromatic polyether selected from the group polyetherimides, polyethersulfones, polyetherketones, polyetheretherketones, and combinations thereof, and an organic solvent, wherein the mixture comprises less than 0.005 weight percent of water.

DETAILED DESCRIPTION

The terms "first," "second," and the like, "primary," "secondary," and the like, "(a)," "(b)" and the like, as used herein do not denote any order, quantity, or importance, but rather are used to distinguish one element from another. The terms "a" and "an" do not denote a limitation of quantity, but rather denote the presence of at least one of the referenced item. "Optional" or "optionally" means that the subsequently described event or circumstance may or may not occur, and that the description includes instances where the event occurs and instances where it does not. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments. "Consisting essentially of"

as used herein in relation to the polymer containing mixture refers to a mixture that contains the recited elements (polymer and organic solvent) and may contain impurities in amounts that will not affect the physical properties of the polymer such as intrinsic viscosity.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl radical.

The term "alkyl" is intended to include both branched and straight-chain, saturated aliphatic hydrocarbon radicals having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n-and s-heptyl, and, n- and s-octyl.

The term "alkenyl" is defined as a branched or straight-chain unsaturated aliphatic hydrocarbon radical having one or more double bonds between two or more carbon atoms. Examples of alkenyl radicals include ethenyl, propenyl, butenyl, pentenyl, hexenyl, heptenyl, octenyl and nonenyl and the corresponding $C_{2-10}$ dienes, trienes and quadenes.

The term "substituted" means that one or more hydrogens on the molecule, portion of the molecule, or atom are replaced with substitution groups provided that an atom's normal valency is not exceeded, and that the substitution results in a stable compound. Such "substitution groups" may be selected from the group consisting of: —OR, —NR'R, —C(O)R, —SR, -halo, —CN, —$NO_2$, —$SO_2$, phosphoryl, imino, thioester, carbocyclic, aryl, heteroaryl, alkyl, alkenyl, bicyclic and tricyclic groups. When a substitution group is a keto (i.e., =O) group, then 2 hydrogens on the atom are replaced. Keto substituents are not present on aromatic moieties. The terms R and R' refer to alkyl radicals that may be the same or different.

The description is intended to include all permutations and combinations of the substitution groups as described by the formulas herein with the proviso that each permutation or combination can be selected by specifying the appropriate variable or substitution groups.

Thus, for example, the term "substituted $C_{1-10}$ alkyl" refers to alkyl moieties containing saturated bonds and having one or more hydrogens replaced by, for example, halogen, carbonyl, alkoxy, ester, ether, cyano, phosphoryl, imino, alkylthio, thioester, sulfonyl, nitro, heterocyclo, aryl, or heteroaryl.

The terms "halo", "halide" or "halogen" as used herein refer to fluoro, fluoride, chloro, chloride, bromo, bromide, iodo or iodide as appropriate in context.

The term "monocyclic" as used herein refers to groups comprising a single ring system. The ring system may be aromatic, heterocyclic, aromatic heterocyclic, a saturated cycloalkyl, or an unsaturated cycloalkyl. The monocyclic group may be substituted or unsubstituted. Monocyclic alkyl groups may have 5 to 12 ring members.

The term "polycyclic" as used herein refers to groups comprising multiple ring systems. The rings may be fused or unfused. The polycyclic group may be aromatic, heterocyclic, aromatic heterocyclic, a saturated cycloalkyl, an unsaturated cycloalkyl, or a combination of two or more of the foregoing. The polycyclic group may be substituted or unsubstituted. Polycyclic groups may have 6 to 20 ring members.

The term "independently selected from", "independently, at each occurrence" or similar language, means that the labeled R substitution groups may appear more than once and may be the same or different when appearing multiple times in the same structure. Thus the $R^1$ may be the same or different than the $R^6$ and if the labeled $R^6$ substitution group appears four times in a given permutation of Formula I, then each of those labeled $R^6$ substitution groups may be, for example, a different alkyl group falling within the definition of $R^6$.

Other than in operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein the term guanidinium catalyst includes guanidinium salts and guanidinium ions as appropriate to the situation being described. Filtration has been used to describe solid liquid separation and is intended to include mechanical separation, decantation, liquid-solid cyclone separators, centrifugation, and vacuum conveyor belt separation.

The polyethers are derived from combining a dihydroxy-substituted aromatic hydrocarbon moiety and a substituted aromatic compound of the formula (I):

$$Z(A^1-X^1)_2 \quad (I)$$

wherein Z is an activating radical, $A^1$ is an aromatic radical and $X^1$ is fluoro, chloro, bromo, or nitro, in the presence of a catalytically active amount of a phase transfer catalyst. In one suitable procedure an alkali metal salt of a dihydroxy-substituted aromatic hydrocarbon is combined with an aromatic compound of generic formula (I). The alkali metal salts of dihydroxy-substituted aromatic hydrocarbons which are employed are typically sodium or potassium salts. Sodium salts are frequently used for reason of their availability and relatively low cost. Said salt may be employed in anhydrous form. However, in certain instances the employment of a hydrate, such as the hexahydrate of the bisphenol A sodium salt, may be advantageous provided water of hydration is removed before the substituted aromatic compound is introduced.

Suitable dihydroxy-substituted aromatic hydrocarbons include those having the formula (II):

$$HO-A^2-OH \quad (II)$$

wherein $A^2$ is a divalent aromatic hydrocarbon radical. Suitable $A^2$ radicals include m-phenylene, p-phenylene, 4,4'-biphenylene, 4,4'-bi(3,5-dimethyl)phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

In various embodiments the $A^2$ radical has the formula (III):

$$-A^3-Y-A^4-, \quad (III)$$

wherein each of $A^3$ and $A^4$ is a monocyclic divalent aromatic hydrocarbon radical and Y is a bridging hydrocarbon radical in which one or two atoms separate $A^3$ from $A^4$. The free valence bonds in formula (III) are usually in the meta or para positions of $A^3$ and $A^4$ in relation to Y. Compounds in which $A^2$ has formula (III) are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula (III) the $A^3$ and $A^4$ values may be unsubstituted phenylene, or halo or hydrocarbon-substituted derivatives thereof, illustrative substituents (one or more) being alkyl, alkenyl, bromo or chloro. Unsubstituted phenylene radicals are employed in certain embodiments. In some embodiments both $A^3$ and $A^4$ are p-phenylene, although both may be o- or m-phenylene or one o- or m-phenylene and the other p-phenylene.

The bridging radical, Y, is one in which one or two atoms separate $A^3$ from $A^4$. Illustrative radicals of this type include gem-alkylene (alkylidene) radicals; methylene, cyclohexylmethylene, 2-[2.2.1]-bicycloheptylmethylene, ethylene, isopropylidene, neopentylidene, cyclohexylidene, cyclopentadecylidene, cyclododecylidene and adamantylidene. Also included are unsaturated radicals.

Suitable dihydroxy-substituted aromatic hydrocarbons also include those containing indane structural units such as represented by the formula (IV), which compound is 3-(4-hydroxyphenyl)-1,1,3-trimethylindan-5-ol, and by the formula (V), which compound is 1-(4-hydroxyphenyl)-1,3,3-trimethylindan-5-ol:

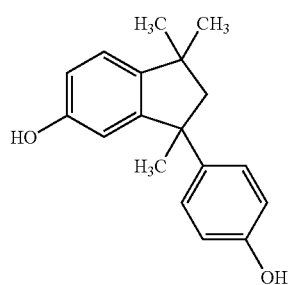

(IV)

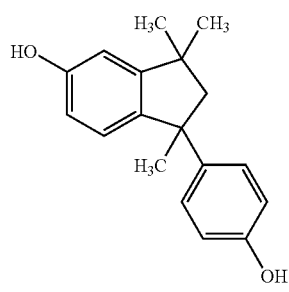

(V)

Also included among suitable dihydroxy-substituted aromatic hydrocarbons are the 2,2,2'2,'-tetrahydro-1,1'-spirobi[1H-indene]diols having formula (VI):

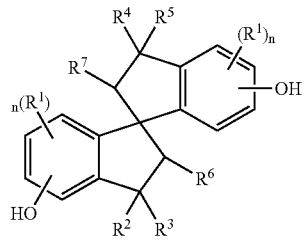

(VI)

wherein each $R^1$ is independently selected from monovalent hydrocarbon radicals and halogen radicals; each $R^2$, $R^3$, $R^4$, and $R^5$ is independently $C_{1-6}$ alkyl; each $R^6$ and $R^7$ is independently H or $C_{1-6}$ alkyl; and each n is independently selected from positive integers having a value of from 0 to 3 inclusive. A particular 2,2,2',2'-tetrahydro-1,1'-spirobi[1H-indene]-diol is 2,2,2',2'-tetrahydro-3,3,3',3'-tetramethyl-1,1'-spirobi[1H-indene]-6,6'-diol.

Some illustrative examples of dihydroxy-substituted aromatic hydrocarbons of formula (II) include 6-hydroxy-1-(4'-hydroxyphenyl)-1,3,3-trimethylindane; 4,4'-(3,3,5-trimethylcyclohexylidene)diphenol; 1,1-bis(4-hydroxy-3-methylphenyl)cyclohexane; 2,2-bis(4-hydroxyphenyl) propane (commonly known as bisphenol-A); 2,2-bis(4-hydroxy-3,5-dimethylphenyl)propane; 4,4-bis(4-hydroxyphenyl)heptane; 2,2-bis(4-hydroxy-3-methylphenyl)propane; 2,2-bis(4-hydroxy-3-ethylphenyl) propane; 2,2-bis(4-hydroxy-3-isopropylphenyl)propane; 3,5,3',5'-tetrachloro-4,4'-dihydroxyphenyl)propane; 2,4'-dihydroxyphenyl sulfone; 2,4'-dihyroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)propane; bis(4-hydroxyphenyl)cyclohexylmethane; 2,2-bis(4-hydroxyphenyl)-1-phenylpropane; 2,6-dihydroxynaphthalene; hydroquinone; resorcinol; and $C_{1-3}$ alkyl-substituted resorcinols. In some embodiments the dihydroxy-substituted aromatic hydrocarbon is bisphenol A in which the radical of formula (III) is the 2,2-bis(4-phenylene)propane radical and in which Y is isopropylidene and $A^3$ and $A^4$ are each p-phenylene.

The substituted aromatic compounds of formula (I) contain an aromatic radical $A^1$ and an activating radical Z. The $A^1$ radical is normally a di- or polyvalent $C_{6-10}$ radical, which in various embodiments may be monocyclic and free from electron-withdrawing substituents other than Z. Unsubstituted $C_6$ aromatic radicals may be employed for the $A^1$ radical. The radical Z is one which activates a leaving group X on an aromatic radical for displacement by alkali metal salts of dihydroxy-substituted aromatic hydrocarbons. The Z radical is usually an electron-withdrawing group, which may be di- or polyvalent to correspond with the valence of $A^1$. Illustrative examples of divalent radicals include carbonyl, carbonylbis(arylene), sulfone, bis(arylene)sulfone, benzo-1,2-diazine and azoxy. Illustrative examples of the moiety -$A^1$-Z-$A^1$- include bis(arylene)sulfone, bis(arylene)ketone, tris(arylene)bis(sulfone), tris(arylene)bis(ketone), bis(arylene)benzo-1,2-diazine or bis(arylene)azoxy radical and especially those in which $A^1$ is p-phenylene.

Also included are compounds in which -$A^1$-Z-$A^1$- is a bisimide radical, illustrated by those of the formula (VII):

(VII)

wherein $R^8$ is a substituted or unsubstituted $C_{6-20}$ divalent aromatic hydrocarbon radical, a $C_{2-22}$ alkylene or cycloalkylene radical, or a $C_{2-8}$ bis(alkylene-terminated) polydiorganosiloxane radical.

In one embodiment of the invention $R^8$ is derived from a diamine selected from the group consisting of aliphatic, aromatic, and heterocyclic diamines. Exemplary aliphatic moieties include, but are not limited to, straight chain, branched, and cycloalkyl radicals, and their substituted derivatives. Straight-chain and branched alkyl radicals are typically those containing from 2 to 22 carbon atoms, and include as illustrative non-limiting examples ethyl, propyl, butyl, neopentyl, hexyl, dodecyl. Cycloalkyl radicals are typically those containing from 3 to 12 ring carbon atoms. Some illustrative non-limiting examples of cycloalkyl radicals include cyclobutyl, cyclopentyl, cyclohexyl, methyl cyclohexyl, and cycloheptyl.

In various embodiments the two amino groups in diamine-derived aliphatic moieties are separated from each other by at least two and sometimes by at least three carbon atoms. In particular embodiments for diamines, the two amino groups are in the alpha, omega positions of a straight-chain or branched alkyl radical, or their substituted derivatives; or in the 1,4-positions of a cycloalkyl radical or its substituted derivatives. In various embodiments substituents for the aliphatic moieties include one or more halogen groups, such as fluoro, chloro, or bromo, or mixtures thereof; or one or more aryl groups, such as phenyl groups, alkyl- or halogen-substituted phenyl groups, or mixtures thereof. In some embodiments substituents for aliphatic moieties, when present, are chloro or unsubstituted phenyl.

Aromatic moieties suitable for $R^8$ in formula (VII) include, but are not limited to, monocyclic, polycyclic and fused aromatic compounds having in some embodiments from 6 to 20, and in other embodiments from 6 to 18 ring carbon atoms, and their substituted derivatives. Polycyclic aromatic moieties may be directly linked by a covalent bond (such as, for example, biphenyl) or may be separated by 1 or 2 atoms comprising linking moieties as in formula (VIII)

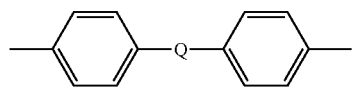

(VIII)

in which Q is

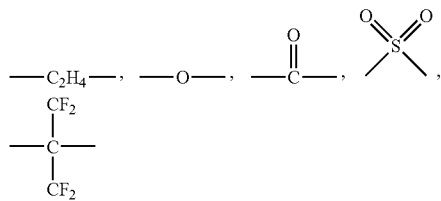

or a covalent bond. Representative linking moieties may also include phosphoryl, S, and $C_{1-6}$ aliphatic, such as isopropylidene and methylene. Illustrative non-limiting examples of aromatic moieties include phenyl, biphenyl, naphthyl, bis(phenyl)methane, bis(phenyl)-2,2-propane, and their substituted derivatives. In some embodiments substituents include one or more halogen groups, such as fluoro, chloro, or bromo, or mixtures thereof; or one or more straight-chain-, branched-, or cycloalkyl groups having from 1 to 22 carbon atoms, such as methyl, ethyl, propyl, isopropyl, tert-butyl, or mixtures thereof. In particular embodiments substituents for aromatic moieties, when present, are chloro, methyl, ethyl, or mixtures thereof.

In various embodiments the two amino groups in diamine-derived aromatic moieties are separated by at least two and sometimes by at least three ring carbon atoms. When the amino group or groups are located in different aromatic rings of a polycyclic aromatic moiety, they are often separated from the direct linkage or from the linking moiety between any two aromatic rings by at least two and sometimes by at least three ring carbon atoms. In some embodiments diamines include meta-phenylenediamine; para-phenylenediamine; mixtures of meta- and para-phenylenediamine; isomeric 2-methyl- and 5-methyl-4,6-diethyl-1,3-phenylenediamines or their mixtures; bis(4-diaminophenyl)-2,2-propane; and bis(2-chloro-4-amino-3,5-diethylphenyl)methane.

Heterocyclic moieties suitable for $R^8$ in formula (VII) include, but are not limited to, monocyclic, polycyclic and fused heterocyclic compounds having in some embodiments 3 to 30, in other embodiments 5 to 13 ring carbon atoms, and 1 to 4 ring heteroatoms. The ring heteroatoms include, but are not limited to, oxygen, nitrogen, sulfur, or combinations thereof. In some embodiments ring heteroatoms are nitrogen. Polycyclic heterocyclic moieties may be directly linked by a covalent bond (such as, for example, bipyridyl) or may be separated by 1 or 2 atoms comprising linking moieties. Representative linking moieties include, but are not limited to, carbonyl, phosphoryl, O, S, $SO_2$, and $C_{1-6}$ aliphatic such as isopropylidene and methylene.

In various embodiments the two amino groups in diamine-derived heterocyclic moieties are separated by at least two and sometimes by at least three ring atoms. When the amino group or groups are located in different heterocyclic rings of a polycyclic heterocyclic moiety, they are separated from the direct linkage or from the linking moiety between any two heterocyclic rings by at least two and sometimes by at least three ring atoms. Exemplary heterocyclic moieties include, but are not limited to, furyl, pyridyl, bipyridyl, pyrryl, pyrazinyl, pyrimidyl, pyrazolyl, thiazyl, thienyl, bithienyl, and quinolyl.

Most often, $R^8$ is m-phenylene, p-phenylene, 4,4'-oxybis(phenylene) or

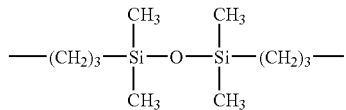

Polyvalent Z radicals include those in which Z together with $A^1$ form part of a fused ring system such as benzimidazole, benzoxazole, quinoxaline or benzofuran.

Also present in the substituted aromatic compound of formula (I) are two displaceable $X^1$ radicals which may be fluoro, chloro, bromo, or nitro. In some instances, fluoro and especially chloro atoms are employed by reason of the relative availability and effectiveness of the compounds containing them. The relative positions of the two $X^1$ radicals on two aromatic rings are such that they are activated for displacement by alkali metal salts of dihydroxy-substituted aromatic hydrocarbons. The two $X^1$ radicals are often each in the para position, each in the meta position, or one substituent is in the para position and one in the meta position relative to the an activating group Z on an aromatic ring (or relative to a second aromatic group attached to an activating group Z on an aromatic ring).

In various embodiments substituted aromatic compounds of formula (I) include, but are not limited to, bis(4-fluorophenyl)sulfone and the corresponding chloro compound, bis(4-fluorophenyl)ketone and the corresponding chloro compound, and 1,3- and 1,4-bis[N-(4-fluorophthalimido)]benzene, 1,3- and 1,4-bis[N-(3-fluorophthalimido)]benzene, 4,4'-bis[N-(4-fluorophthalimido)]phenyl ether, 4,4'-bis[N-(3-fluorophthalimido)]phenyl ether, and the corresponding chloro and bromo compounds, for example, 1,3-bis[N-(4-chlorophthalimido)]benzene, 1,4-bis[N-(4-chlorophthalimido)]benzene, 1,3-bis[N-(3-chlorophthalimido)]benzene, 1,4-bis[N-(3-chlorophthalimido)]benzene, 1-[N-(4-chlorophthalimido)]-3-[N-(3-chlorophthalimido)benzene, or 1-[N-(4-chlorophthalimido)]-4-[N-(3-chlorophthalimido)benzene.

Also present in the polymer-containing mixture is a phase transfer catalyst, which in various embodiments is substantially stable at the temperatures employed; i.e., in the range of 125-250° C. The phase transfer catalyst is a guanidinium catalyst of the type disclosed in the aforementioned U.S. Pat. No. 5,229,482. In some embodiments the phase transfer catalyst comprises the hexaalkylguanidinium and alpha,omega-bis(pentaalkylguanidinium)alkane salts, particularly the chloride salts. In some embodiments the catalyst is 1,6-bis(penta-n-butylguanidinium)hexane dibromide. In some embodiments the catalyst is hexaethylguanidinium chloride.

In some embodiments the organic solvent comprises a substantially water-immiscible organic solvent. The organic solvent may completely or at least partially dissolve reaction ingredients. Suitable solvents are those which have a boiling point at atmospheric pressure of greater than or equal to 110° C. or, more specifically, greater than or equal to 125° C. In some embodiments the organic solvent has a density in a ratio of greater than 1.1:1, or, more specifically, greater than 1.15:1, or, even more specifically, greater than 1.2:1 compared to the density of water at 20-25° C. The density of water at 20-25° C. is 0.997 grams per cubic centimeter. Substantially water-immiscible means that the organic solvent dissolves to the extent of less than or equal to 10 weight percent in water based on the total weight of the water, or, more specifically, less than or equal to 5 weight percent based on the total weight of the water, or that water dissolves to the extent of less than 10 weight percent in the organic solvent, based on the total weight of the solvent, or, more specifically, less than 5 weight percent based on the total weight of the solvent. In some embodiments solvents are aromatic hydrocarbons, or, more specifically halogenated aromatic hydrocarbons. Exemplary solvents include diphenylsulfone, veratrole (1,2-dimethoxybenzene), chlorinated benzenes, such as chlorobenzene, dichlorotoluene, 1,2,4-trichlorobenzene, and o-dichlorobenzene (hereinafter often referred to as ODCB). Mixtures of solvents may also be employed.

When the polymerization reaction has reacted to the desired degree of completion, the polymer is quenched using an acid and after that the catalyst and any catalyst byproducts (also known as catalyst decomposition products) are removed, at least in part, by adsorption. In some embodiments the polymerization reaction mixture, prior to removal of the catalyst and any catalyst by product, is at a temperature higher than that used for adsorption and filtration, for example 160° C. to the boiling point of the organic solvent in the polymerization mixture. When the polymerization mixture comprises more than one organic solvent then the upper limit for the temperature of the polymerization reaction mixture is the lowest boiling point of the organic solvents used.

The acid quench can be performed at a temperature of 25 to 220° C., or, more specifically, 100 to 180° C., or, more specifically, 120 to 180° C. Acid quench can be performed for a time of 15 to 45 minutes, or, more specifically, 20 to 40 minutes, or, even more specifically, 25 to 35 minutes. In some embodiments the acid quench is performed at a temperature that is higher than the adsorption and filtration temperature.

After quenching the quenched mixture may be diluted with an organic solvent. The organic solvent used for dilution can be the same or different from the organic solvent used for the polymerization reaction.

The catalyst and any catalyst byproducts are adsorbed onto an alkali metal halide under conditions sufficient to promote adsorption to form an adsorbed component. The adsorbed component is removed by solid-liquid separation methods such as centrifugation, filtration, decantation, and the like as well as a combination of methods. The adsorbed component is removed in the substantial absence of water. Substantial absence of water means that the polymer containing mixture contains an amount of water that is less than or equal to 0.005 weight percent (50 ppm) or, more specifically, less than or equal to 0.0025 weight percent, or, more specifically, less than or equal to 0.001 weight percent, based on the total weight of the solution. Adsorbing the catalyst and any catalyst byproducts reduces or eliminates the need for washing the organic solution with water. In instances where a water wash is desired the prior removal of the catalyst reduces or eliminates emulsification issues thereby facilitating phase separation.

Prior to adsorption and filtration, the alkali metal halide can be present in an amount of 10 to 25 weight percent based on the total weight of the polymer. Within this range the amount of alkali metal halide can be greater than or equal to 12 weight percent, or, more specifically, greater than or equal to 15 weight percent. Also within this range the amount of alkali metal halide can be less than or equal to 15 weight percent, or, more specifically, less than or equal to 20 weight percent. In some embodiments the alkali metal halide is a by product of the polymerization reaction, and hence the amount of alkali metal halide is determined by the reactants that are used.

As indicated above the reaction mixture comprises a polyether produced by a halide displacement process, a guanidinium catalyst, organic solvent or a mix of organic solvents, an alkali metal halide, an acid component, and an optional catalyst byproduct. Adsorption occurs at a temperature of 23° C. (room temperature) to 180° C. for a time greater than or equal to 20 seconds. The time for adsorption can be less than 2 hours. However, the invention is versatile and the time for adsorption can be less than substantially longer periods of time, e.g., 200 hours or more. In some embodiments the temperature is 23° C. to 150° C., or, more specifically, 80° C. to 130° C. In some embodiments the mixture is maintained at the desired temperature for 20 to 200 seconds. Generally the filtration temperature differs from the adsorption temperature by less than 10° C., or, more specifically, less than or equal to 5° C., or, even more specifically, less than or equal to 2° C. The filtration temperature refers to the temperature of the mixture when the separation process is begun.

In some embodiments quenching and adsorption both occur at a temperature less than or equal to 160° C., or, more specifically, less than or equal to 120° C.

Following filtration (or other suitable solid separation step), catalyst species may be recovered from the solid medium using methods known in the art, and any non-polyether, soluble species, if still present in the filtrate, may be separated and recovered, for example by further filtration steps or by aqueous methods such as those employing a dynamic or static mixer or any of the aqueous configurations previously discussed.

The polymer containing mixture, immediately after filtration is a solution. A solution is defined as the polymer dissolved in the organic solvent. This solution can comprise the aromatic polyether in an amount less than or equal to 50 weight percent, or, more specifically, less than or equal to 40 weight percent, or, more specifically, in an amount less than or equal to 30 weight percent, based on the total weight of the solution.

It is contemplated that in embodiments in which the alkali metal halide produced by the polymerization reaction has been substantially removed, additional alkali metal halide can be added for the adsorption process Additionally, an isolated polyether comprising a catalyst and/or catalyst byproduct can be dissolved in an organic solvent and purified using the adsorption method described above.

In embodiments where the aromatic polyether comprises an aromatic polyetherimide, the mixture can comprise less than or equal to 1,000 parts by weight of catalyst byproduct per million parts by weight of mixture (ppm) after removal of the adsorbed component. Within this range the amount of the catalyst byproduct can be less than or equal to 300 ppm.

In embodiments where the aromatic polyether comprises an aromatic polyetherimide, the mixture can comprise less than or equal to 150 parts by weight of catalyst per million parts by weight of mixture (ppm) after removal of the adsorbed component. In some embodiments the combined amount of catalyst and catalyst byproduct after removal of the adsorbent is less than or equal to 200 parts by weight per million parts by weight of solution (ppm), or more specifically, less than or equal to 100 ppm, or, even more specifically, less than or equal to 50 ppm.

After removal, the adsorbed component can comprise greater than or equal to 1 milligram (mg) of catalyst byproduct per gram of alkali metal halide, or, more specifically, the adsorbed component can comprise greater than or equal to 60 mg of catalyst byproduct per gram of alkali metal halide.

After removal the adsorbed component can comprise greater than or equal to 4 mg catalyst per gram of alkali metal halide, or, more specifically, the adsorbed component can comprise greater than or equal to 25 mg of catalyst per gram of alkali metal halide.

Following any of the purification procedures illustrated hereinabove, a polyether-containing organic solution may be sent to a polymer isolation step where the polyether may be isolated free of organic solvent by standard methods, such as by anti-solvent precipitation, filtration, and drying, or by devolatilization, for example, in an appropriate extruder with recovery and recycling of the organic solvent. In a particular embodiment a polyether is isolated from a solution comprising ODCB and the ODCB is recovered and recycled for further use. The isolated polyether preferably contains as low a sodium level as possible. The sodium level can be greater than 0 and less than 100 parts per million (ppm) sodium, or, more specifically, less than 50 ppm sodium, or, more specifically, less than 25 ppm sodium, or, more specifically, less than 10 ppm sodium, or, more specifically, less than 7 ppm. Particular polyethers comprise the reaction product of a bisphenol A moiety, a biphenol moiety, or a combination thereof, particularly bisphenol A disodium salt, biphenol disodium salt, or a combination thereof, with a 1,4-bis[N-(4-chlorophthalimido)]benzene, 1,3-bis[N-(4-chlorophthalimido)]benzene, dichlorophenyl sulfone, or a combination of two or more of the foregoing halogenated compounds.

Without further elaboration, it is believed that one skilled in the art can, using the description herein, utilize the invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

All amounts described in the examples are weight percent (wt %) based on the total weight of a composition or mixture unless otherwise specified.

Example 1

The purpose of Example 1 was to show that hexaethylguanidinium chloride catalyst (HEG) and pentaethylguanidine (PEG) are effectively adsorbed in sodium chloride and the experiment is reproducible. A polyetherimide was prepared in ortho-dichlorobenzene through the reaction of bisphenol A disodium salt and 1,3-bis[N-(4-chlorophthalimido)]benzene in the presence of hexaethylguanidinium chloride. Approximately, 100 grams (g) of the 30 wt % polymer solution were diluted with dry ortho-dichlorobenzene to achieve 15 wt % polymer concentration at 165° C. Approximately 0.4 grams (g) of phosphoric acid was added to the solution and allowed to react for 30 minutes in order to quench the polymer. The polymer solution was diluted to 10 wt % polymer with dry ODCB and maintained at 120° C. for approximately five minutes before starting the filtration using a 2-micron metal filter. Filtration lasted approximately twenty (20) minutes. The final solution was analyzed to determine the reduction of HEG and PEG in the filtrate. "HEG initial" and "PEG initial" refer to the amount of HEG and PEG in the polymer solution prior to adsorption and filtration. "HEG final" and "PEG final" refer to the amount of HEG and PEG in the solution after adsorption and filtration. HEG and PEG concentrations were determined by ion chromatography. "mg HEG/g NaCl" and "mg PEG/g NaCl" refer to the amount of HEG and PEG present in the adsorbed component after filtration. The amount of HEG and PEG in the adsorbed component was determined by ion chromatography. Table 1 shows the results.

TABLE 1

|   | HEG initial (ppm) | PEG initial (ppm) | HEG final (ppm) | PEG final (ppm) | mg HEG/g NaCl | mg PEG/g NaCl |
| --- | --- | --- | --- | --- | --- | --- |
| A | 2030 | 1120 | 160 | 435 | 9.5 | 3.5 |
| B | 2300 | 1200 | 90 | 220 | 11.2 | 5.0 |

Table 1 shows that the initial concentration of hexaethylguanidinium chloride (HEG) and pentaethylguanidine (PEG) is reduced in the polymeric solution as these two components are adsorbed in or on the sodium chloride particles that are removed from the solution by filtration. The final mixture is almost free of sodium chloride as well as HEG and PEG that are effectively removed from the polymer solution. These results demonstrate that the HEG and PEG can be removed from the polymer using the by product of the polymerization reaction as an adsorbent, with no need to add any external agent to the solution. HEG and PEG are both surfactants. This adsorption process removes them from the solution. If a further purification is required using water extraction, the possibility of formation of an emulsification will be greatly reduced due to the low amount of catalyst and catalyst by product. Therefore, any subsequent water extraction operation will be more robust and efficient.

Example 2

Example 2 shows the effect of the filtration temperature. A polyetherimide was prepared in ortho-dichlorobenzene through the reaction of bisphenol A disodium salt and 1,3-bis[N-(4-chlorophthalimido)]benzene in the presence of hexaethylguanidinium chloride. Approximately 100 g of the 30 wt % polymer solution were diluted with dry ortho-dichlorobenzene to achieve 15 wt % polymer concentration. Approximately 0.4 g of phosphoric acid was added to the solution and allowed to react for 30 minutes in order to quench the polymer at temperatures of 150 to 165° C. as shown in Table 2. The polymer solution was diluted to 10 wt % polymer with dry ODCB and maintained at 160° C. for approximately five minutes before starting the filtration. The mixture was filtered in a 2-micron metal filter. Filtration lasted for approximately twenty (20) minutes. The final solution and the adsorbed component were analyzed as described above to determine the reduction of HEG and PEG. The results are presented in Table 2.

TABLE 2

|   | Quench temperature (° C.) | HEG initial (ppm) | PEG initial (ppm) | HEG final (ppm) | PEG final (ppm) | mg HEG/g NaCl | mg PEG/g NaCl |
|---|---|---|---|---|---|---|---|
| A | 150 | 1706 | 1034 | 462 | 847 | 6.3 | 0.9 |
| B | 157 | 1832 | 1079 | 608 | 963 | 6.2 | 0.6 |
| C | 165 | 1920 | 1010 | 1055 | 1008 | 4.4 | 0.0 |

The results in Table 2 shows a reduction in the adsorption of HEG and PEG compared with Example 1. Changing the adsorption and filtration temperature from 120° C. to 160° C. reduces the HEG adsorption from approximately 10 mg/g NaCl to approximately 6 mg/g NaCl and the PEG adsorption from approximately 5 mg/g NaCl to less than 1 mg/g NaCl. Therefore, lower temperatures for adsorption increases the retention of the guanidium materials in the alkali metal halide.

Example 3

This example shows the importance of residence time to achieve the full adsorption of the HEG and PEG on the sodium chloride. A polyetherimide was prepared in ortho-dichlorobenzene through the reaction of bisphenol A disodium salt and 1,3-bis[N-(4-chlorophthalimido)]benzene in the presence of hexaethylguanidinium chloride catalyst. Approximately, 100 g of the 30 wt % polymer solution were diluted with dry ortho-dichlorobenzene to achieve 25 wt % polymer concentration at 180° C. Phosphoric acid was added to the solution and allowed to react for 30 minutes in order to quench the polymer. The polymer solution was cooled down and maintained at approximately 120° C. for the amount of time indicated and diluted to 10% polymer with dry ODCB The adsorbed component was analyzed to determine the adsorption of HEG and PEG as a function of time. The results are presented in Table 3

TABLE 3

| Time (s) | mg HEG/g NaCl | mg PEG/g NaCl |
|---|---|---|
| 41 | 11.2 | 4.3 |
| 92 | 14.1 | 5.5 |
| 134 | 14.4 | 5.5 |
| 167 | 14.5 | 5.6 |
| 188 | 14.6 | 5.7 |
| 209 | 14.6 | 5.7 |

Table 3 shows the effect of residence time on the adsorption of HEG and PEG on the sodium chloride salt. The data indicates that a minimum residence time is required to assure that the maximum adsorption is achieved for the experiment conditions Example 4

This example shows that the invention is not only reproducible in the lab, but it is scalable to a commercial size. A polyetherimide was prepared in ortho-dichlorobenzene in a 500 gallon (1893 liters) reactor through the reaction of bisphenol A disodium salt and 1,3-bis[N-(4-chlorophthalimido)]benzene in the presence of hexaethylguanidinium chloride. Approximately, 1500 lb (750 kilograms) of the 30 wt % polymer solution were diluted with dry ortho-dichlorobenzene to achieve 15 wt % polymer concentration at 180° C. Phosphoric acid was added to the solution and allowed to react for 30 minutes to quench the polymer. The polymer solution was diluted to 10 wt % polymer with dry ODCB and cooled to a temperature as shown in Table 4. The filtration started after 10-30 minutes after reaching the temperature and the mixture was filtered through a 2-micron metal filter for approximately twenty (20) minutes. The adsorbed component was analyzed to determine the amount of HEG and PEG. The results are presented in Table 4.

TABLE 4

|   | HEG in (ppm) | PEG in (ppm) | mg HEG/g NaCl | mg PEG/g NaCl | Temperature of filtration (° C.) |
|---|---|---|---|---|---|
| A | 3395 | 716 | 16.1 | 3.5 | 115 |
| B | 3357 | 1152 | 14.5 | 4.8 | 120 |
| C | 2676 | 909 | 13.3 | 4.5 | 110 |
| D | 2030 | 695 | 9.8 | 3.3 | 112 |
| E | 2186 | 792 | 10.9 | 3.9 | 110 |
| F | 2199 | 894 | 11.0 | 4.4 | 110 |

The invention was scaled up in a pilot plant facility and repeated over the course of six different polymerization runs as shown in the data above. The adsorption values obtained in the lab for the same set of operation conditions were comparable to the adsorptions obtained in the pilot scale up.

Example 5

The purpose of this example is to show the effect of a different polyetherimide. A different polyetherimide was prepared in ortho-dichlorobenzene through the reaction of bisphenol A disodium salt and 1,4-bis-[N-(chlorophthalimido)]diphenyl sulfone in the presence of hexaethylguanidinium chloride catalyst. Approximately, 1500 lb (750 kilograms) of a 30 wt % polymer solution were diluted with dry water ortho-dichlorobenzene and veratrole to achieve 15 wt % polymer concentration at 165° C. Phosphoric acid was added to the solution and allowed to react for 30 minutes in order to quench the polymer. The polymer solution was diluted to 10 wt % polymer with dry ODCB and cooled to the temperatures shown in Table 5. The filtration started after 10-30 minutes after reaching the temperature and the mixture was filtered through a 2-micron metal filter. The adsorbed component was analyzed to determine the amount of HEG and PEG. The results are presented in Table 5.

TABLE 5

| Experiment | HEG initial (ppm) | PEG initial (ppm) | mg HEG/g NaCl | mg PEG/g NaCl | Temperature of filtration (° C.) |
|---|---|---|---|---|---|
| A | 3099 | 237 | 16.3 | 0.9 | 160 |
| B | 4372 | 174 | 25.9 | 0.9 | 118 |
| C | 5687 | 270 | 29.1 | 0.9 | 118 |
| D | 3363 | 407 | 18.8 | 2.4 | 121 |
| E | 3206 | 174 | 19.0 | 1.0 | 104 |

Table 5 shows that HEG and PEG can be effectively adsorbed in a different polyethermide.

Example 6

The purpose of this example was to show the effect of a different polyetherimide. A different polyetherimide was prepared in ortho-dichlorobenzene through the reaction of bisphenol A disodium salt and biphenol disodium salt with 1,4-bis[N-(chlorophthalimido)]diphenyl sulfone in the presence of hexaethylguanidinium chloride. Approximately, 1500 lb (750 kilograms) of the 30 wt % polymer solution were diluted with dry ortho-dichlorobenzene and veratrole to achieve 15 wt % polymer concentration at 165° C. Phosphoric acid was added to the solution and allowed to react for 30 minutes in order to quench the polymer. The polymer solution diluted to 10 wt % polymer with dry ODCB and cooled to the temperatures shown in Table 6. The filtration started after 10-30 minutes after reaching the temperature and the mixture was filtered through a 2-micron metal filter. The adsorbed component was analyzed to determine the adsorption of HEG and PEG. The results are presented in Table 6.

TABLE 6

| | Temperature of filtration (° C.) | mg HEG/g NaCl | mg PEG/g NaCl |
|---|---|---|---|
| A | 122 | 4.0 | 61.3 |
| B | 111 | 6.4 | 68.9 |
| C | 89 | 5.2 | 66.3 |

Table 6 shows that HEG and PEG can be effectively adsorbed in a different polyethermide that it is made using two salts.

Example 7

The purpose of this example was to show that the adsorption process occurs even with other polymer backbones, such as polyether sulfones. A polyethersulfone was prepared in ortho-dichlorobenzene through the reaction of bisphenol A disodium salt and biphenol salt with dichloro diphenyl sulfone in the presence of hexaethylguanidinium chloride. Approximately, 1500 lb (750 kilograms) of a 25 wt % polymer solution were diluted with dry ortho-dichlorobenzene to achieve 15 wt % polymer concentration at 165° C. Phosphoric acid was added to the solution and allowed to react for 30 minutes in order to quench the polymer. The polymer solution was diluted to 10 wt % polymer with dry ODCB and cooled to a temperature as summarized in Table 7. The filtration started 10-30 minutes after reaching the temperature and the mixture was filtered through a 2-micron metal filter. The adsorbed component was analyzed to determine the adsorption of HEG and PEG. The results are presented in Table 7.

TABLE 7

| | Temperature of filtration (° C.) | mg HEG/g NaCl | mg PEG/g NaCl |
|---|---|---|---|
| A | 127 | 10.4 | 37.8 |
| B | 105 | 11.4 | 32.2 |
| C | 120 | 14.6 | 34.2 |

Table 7 shows that HEG and PEG can be effectively adsorbed from a polymerization reaction mixture from yet another polyether. Previous examples were performed using polyetherimides. This example shows that the results are consistent for polyethersulfones too.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All patents cited herein are incorporated by reference in their entirety.

The invention claimed is:

1. A process comprising sequentially:
   (a) subjecting a first mixture to a first temperature, wherein the first mixture comprises (i) an aromatic polyether made by a halide displacement polymerization process and selected from the group polyetherimides, polyethersulfones, polyetherketones, polyetheretherketones, and combinations thereof, (ii) a guanidinium catalyst, (iii) an alkali metal halide, (iv) an acid component selected from the group consisting of acids, acid salts, and combinations thereof, and (v) an organic solvent;
   (b) subjecting the first mixture to a second temperature for a time sufficient to promote adsorption of the guanidinium catalyst with the alkali metal halide, thereby forming an adsorbed component comprising the guanidinium catalyst and alkali metal halide;
   (c) using a liquid-solid separation technique to remove the adsorbed component from the first mixture at a third temperature to form a second mixture;
   wherein less than 0.005 weight percent (50 ppm) of water is present during the process, based on the total weight of the first mixture
   wherein the first temperature is higher than the second temperature and the second temperature is 23° to 150° C.

2. The process of claim 1, wherein the time for (b) is greater than or equal to 20 seconds and less than 200 hours.

3. The process of claim 1, wherein the removing of the adsorbed component is carried out by a member selected from the group consisting of filtering, centrifugation, decantion, solid-liquid separation, and combinations thereof.

4. The process of claim 1, wherein the process further comprises adding a component selected from the group consisting of organic solvents during a step selected from the group consisting of step(a), step(b), combinations thereof, and between steps (a) and (b),
   wherein addition of the components results in the formation of a diluted first mixture.

5. The process of claim 1, wherein the first mixture and the adsorbed component comprise a catalyst byproduct and the adsorbed component comprises the catalyst byproduct in an amount greater than or equal to 1 milligram of catalyst byproduct per gram of alkali metal halide.

6. The process of claim 1, wherein the adsorbed component comprises the catalyst byproduct in an amount greater than or equal to 60 milligrams of catalyst byproduct per gram of alkali metal halide.

7. The process of claim 1, wherein the adsorbed component comprises the catalyst in an amount greater than or equal to 4 milligrams of catalyst per gram of alkali metal halide.

8. The process of claim 1, wherein the adsorbed component comprises the catalyst in an amount greater than or equal to 25 milligrams of catalyst per gram of alkali metal halide.

9. The process of claim 1, wherein the third temperature differs from the second temperature by less than 10° C.

10. The process of claim 1, wherein the third temperature differs from the second temperature by less than 5° C.

11. The process of claim 1, wherein the third temperature differs from the second temperature by less than 2° C.

12. The process of claim 1, wherein the alkali metal halide consists of alkali metal halide produced by the polymerization process.

13. A process comprising:
    (a) quenching a halide displacement polymerization mixture at a first temperature with acid to form a quenched polymerization mixture wherein the polymerization mixture comprises (i) an aromatic polyether component selected from the group polyetherimides, polyethersulfones, polyetherketones, polyetheretherketones, and combinations thereof; (ii) hexaethyl guanidinium chloride (iii) sodium chloride (iv) pentaethyl guanidinine, and (vi at least one organic solvent;
    (b) subjecting the quenched polymerization mixture to a second temperature for a time sufficient to promote adsorption of the guanidinium chloride and the penta ethyl guanidinine with the sodium chloride, thereby forming an adsorbed component comprising the guanidinium chloride and the penta ethyl guanidinine and the sodium chloride;
    (c) using a liquid-solid separation technique to remove the adsorbed component from the quenched polymerization mixture to form a filtered mixture, wherein the adsorbed component comprises greater than or equal to 1 milligram pentaethyl guanidinine per gram of sodium chloride and greater than or equal to 4 milligram of the guanidinium chloride per gram of sodium chloride and wherein the polyether polymer, after isolation, contains less than 50 ppm of the sodium chloride
    wherein second temperature is lower than the first temperature and the second temperature is 23° to 150° C.

14. The process of claim 13, wherein the process further comprises adding an organic solvent to the quenched polymerization mixture prior to adsorption.

15. The process of claim 13, wherein the adsorbed component is removed at the second temperature.

16. The process of claim 13, wherein the first and second temperatures are both less than to 120° C.

* * * * *